Aug. 31, 1937.   H. D. COLMAN   2,091,270
CLUTCH MECHANISM
Filed Sept. 7, 1934   4 Sheets-Sheet 1

INVENTOR
Howard D. Colman
BY
Chindahl, Parker & Carlson
ATTORNEYS

Aug. 31, 1937.   H. D. COLMAN   2,091,270
CLUTCH MECHANISM
Filed Sept. 7, 1934   4 Sheets-Sheet 2
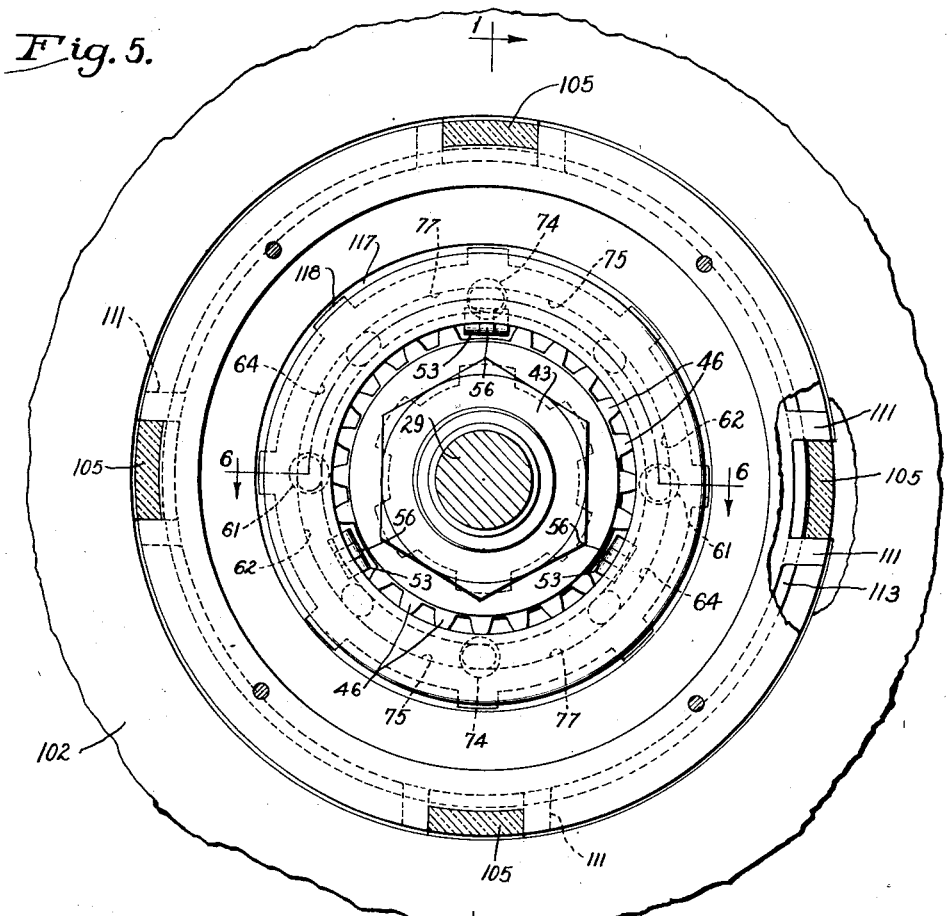
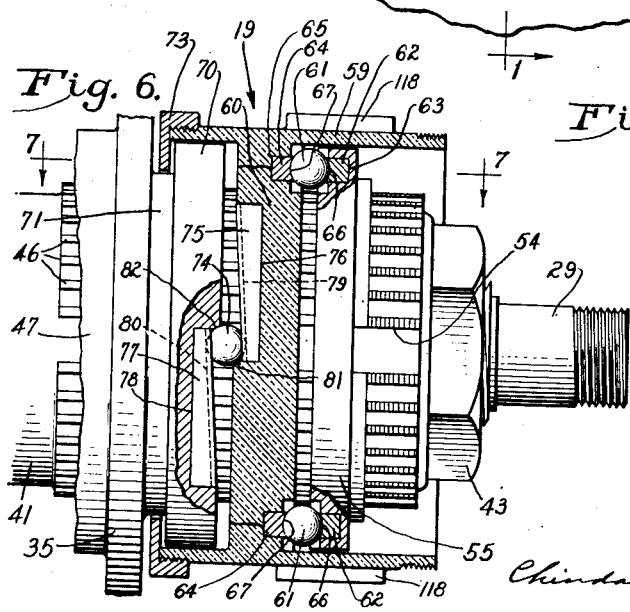
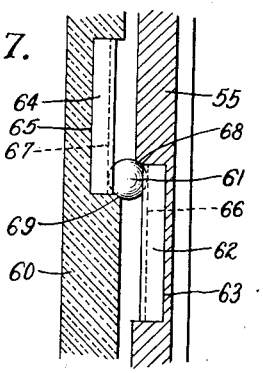
INVENTOR
Howard D. Colman
BY
Chindahl, Parker & Carlson
ATTORNEYS Aug. 31, 1937. H. D. COLMAN 2,091,270
CLUTCH MECHANISM
Filed Sept. 7, 1934 4 Sheets-Sheet 3
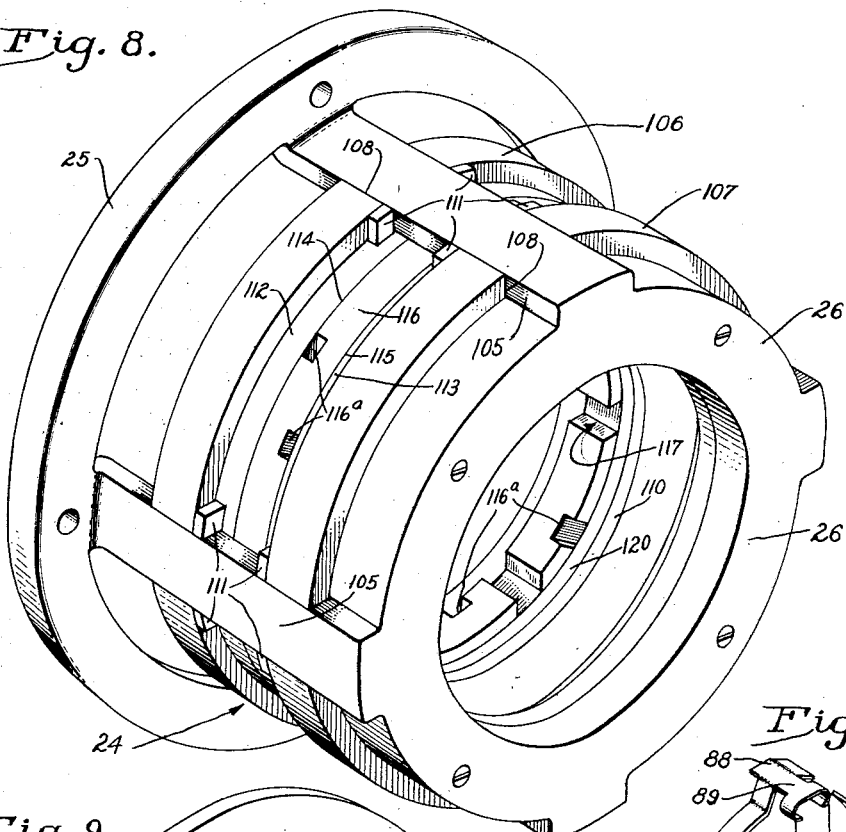
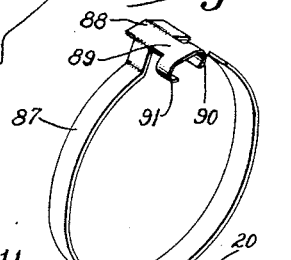
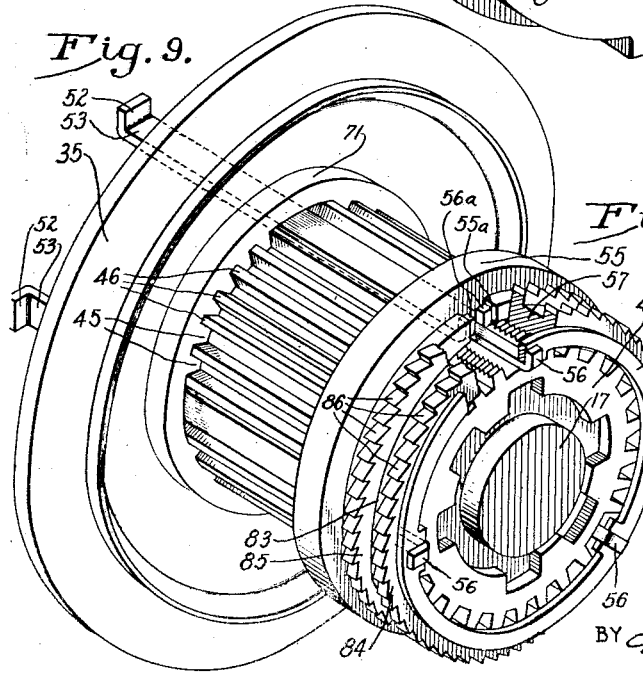
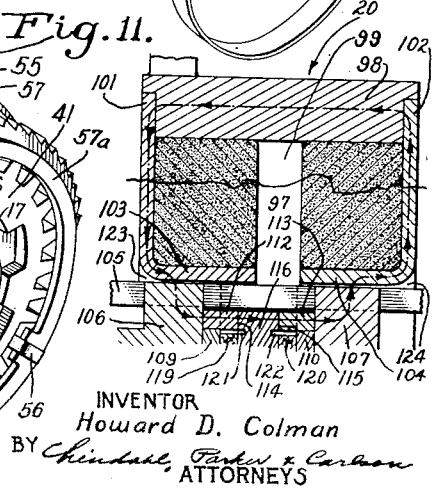
INVENTOR
Howard D. Colman
BY
ATTORNEYS Aug. 31, 1937.   H. D. COLMAN   2,091,270
CLUTCH MECHANISM
Filed Sept. 7, 1934    4 Sheets-Sheet 4
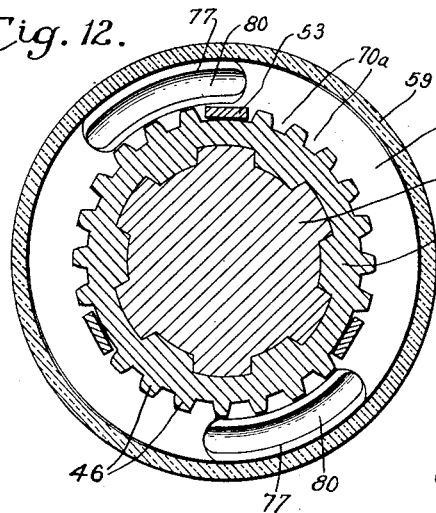
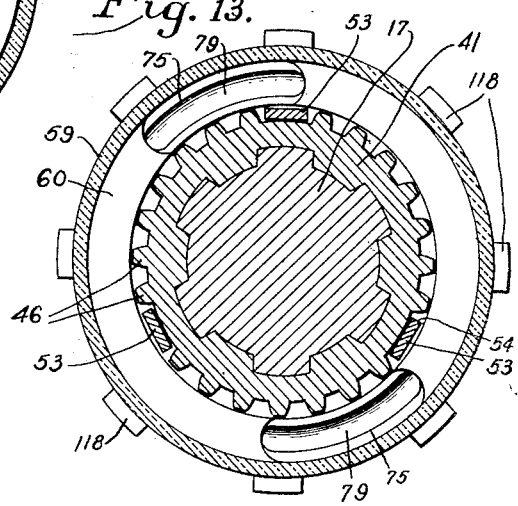
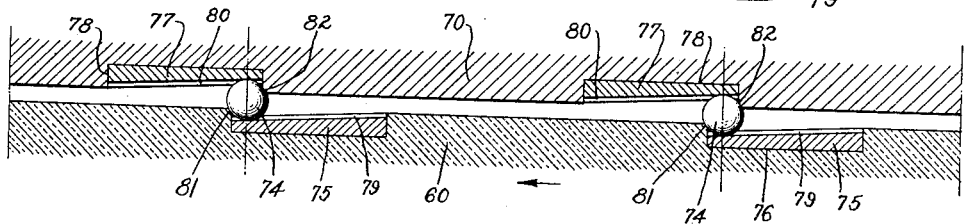
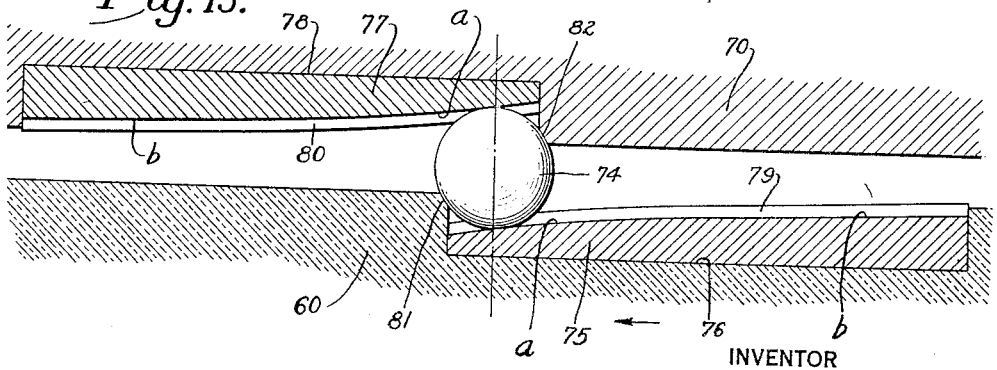
INVENTOR
Howard D. Colman
BY
ATTORNEYS Patented Aug. 31, 1937

2,091,270

UNITED STATES PATENT OFFICE 2,091,270

CLUTCH MECHANISM

Howard D. Colman, Rockford, Ill.

Application September 7, 1934, Serial No. 743,085

29 Claims. (Cl. 192—40)

The present invention relates to a new and improved clutch mechanism.

One of the objects of the invention is to provide a novel clutch mechanism having a main clutch, a pilot clutch, and an end face ball cam actuator operable by the pilot clutch to actuate the main clutch.

Another object resides in the provision of a new and improved clutch mechanism having a main clutch and an electromagnetic pilot clutch with a stationary exciting coil for actuating the main clutch.

A further object is to provide a novel clutch mechanism having a friction disk clutch, an end thrust ball bearing and an end face ball cam actuator reacting against the bearing to close the clutch, and in which the balls of the bearing and the actuator permit a universal rocking movement of the clutch elements so that pressure is imparted equally to the balls and applied uniformly to the clutch elements regardless of mechanical irregularities.

A more specific object resides in the provision of a novel end face ball cam clutch actuator which is simple and inexpensive in construction, which is sensitive, efficient and powerful in action, which is substantially frictionless, which is automatically reversible under a comparatively light axial pressure, and which is self-adjustable to maintain the balls in proper position.

Still another object resides in the provision of a friction disk clutch normally open under the influence of a spring, and new and improved means for automatically adjusting the clutch to compensate for wear, whereby the spring is required to work only through the opening and closing range of the clutch and not through the wear range, and hence is caused to maintain a substantially uniform pressure under all conditions and degrees of wear.

A further object is to provide a novel electromagnetic friction disk clutch, with a stationary exciting coil, having flux transfer gaps which serve also as gaps for eliminating residual magnetism, and are of a low density so as to require a relatively low current input to operate the clutch, and having pole faces in direct and constant rubbing engagement.

Other objects reside in the provision of an electromagnetic friction clutch having new and improved means for automatically compensating for wear, and having novel means for ventilating the friction surfaces and cooling the magnet coil.

Other objects reside in the provision of novel means for lubricating the ball cam actuator, and means for preventing lubricant from reaching the friction surfaces of the clutches.

Further objects and advantages will become apparent as the description proceeds.

In the accompanying drawings, Figure 1 is an axial sectional view taken along line 1—1 of Fig. 5 of a clutch mechanism embodying the features of my invention.

Fig. 5 is a transverse sectional view of the clutch mechanism taken along line 5—5 of Fig. 1.

Fig. 6 is a fragmentary axial sectional view, taken along line 6—6 of Fig. 5, and illustrating the ball cam actuator for the main clutch.

Fig. 7 is a fragmentary sectional detail view taken along line 7—7 of Fig. 6 and illustrating the end thrust bearing for the ball cam actuator.

Fig. 8 is a perspective view on an enlarged scale of the end plates of the pilot clutch and the cage in which they are supported.

Fig. 9 is a perspective view, on an enlarged scale, of a movable end plate, a spline sleeve, the wear adjuster and tie bars forming part of the main clutch.

Fig. 10 is a perspective view of a spring pawl forming part of the self-adjusting mechanism illustrated in Fig. 2.

Fig. 11 is a fragmentary axial sectional view of the pilot clutch, and illustrating the path of flux.

Figure 1:
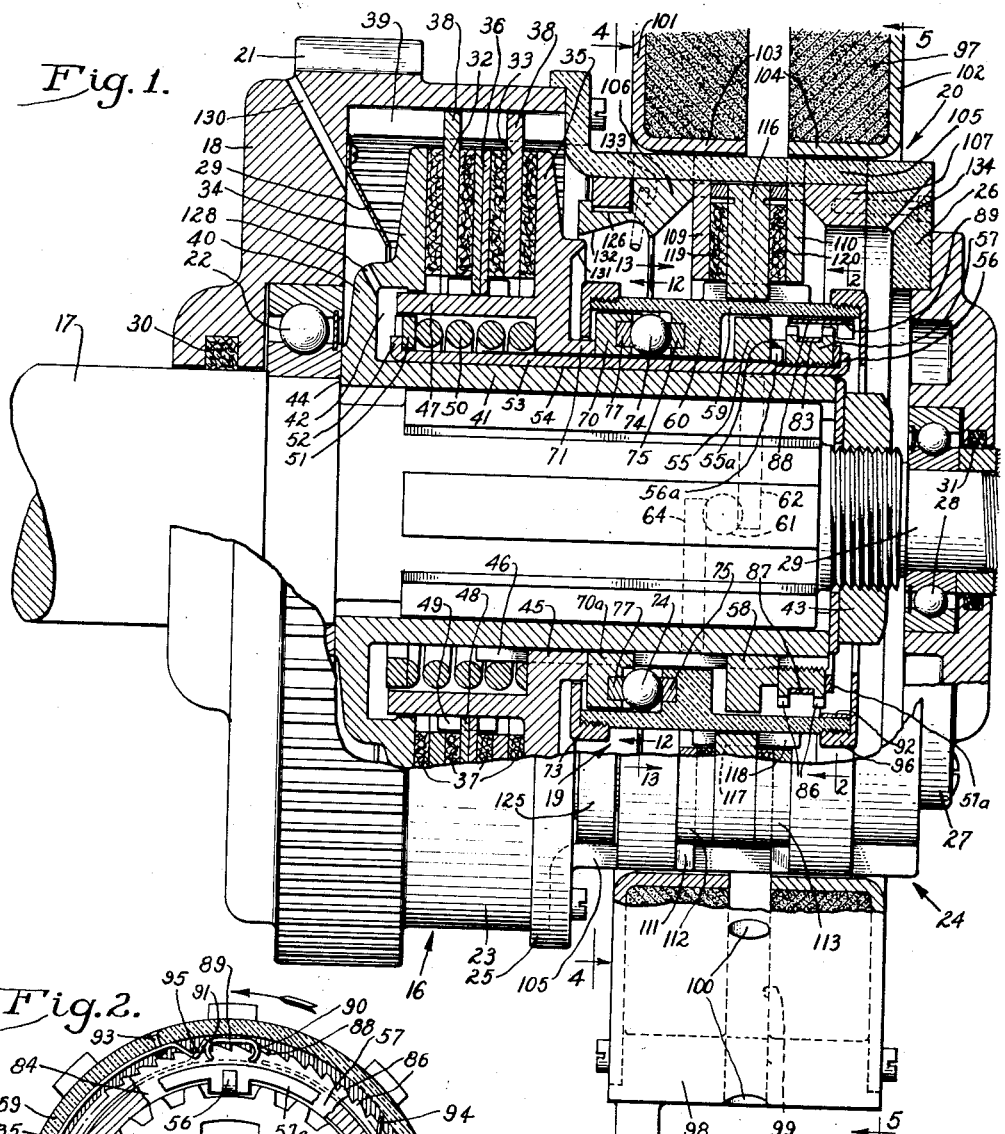

Figs. 12 and 13 are partial transverse sectional views taken respectively along lines 12—12 and 13—13 of Fig. 1.

Figs. 14 and 15 are sectional views respectively showing two different forms of the ball cam actuator in development.

Referring more particularly to the drawings, the clutch mechanism constituting the exemplary embodiment of the invention comprises a main clutch 16 for connecting two elements 17 and 18, a ball cam actuator 19 for closing the main clutch, and a pilot clutch 20 for operating the actuator.

The elements 17 and 18 may assume various forms depending on the different environments in which the clutch mechanism is to be used. Either of the elements 17 and 18 may be connected to a source of power (not shown) to drive the other. In the present instance, the element 17 is shown as a shaft extending substantially through the clutch mechanism, and designated for convenience as the driven element. The other element 18, correspondingly designated as the driving element, consists of a circular plate which is rotatably supported by the shaft 17 and which is formed externally with a power inlet gear 21. Preferably, a ball bearing 22 is interposed between the shaft 17 and the plate 18.

The plate 18 is provided on one side at its outer periphery with an annular coaxial flange 23 which encloses the main clutch 16, and forms part of a housing enclosing the major portion of the clutch mechanism. A cylindrical cage 24, constituting another section of the housing, has an outer peripheral flange 25 on one end attached to the free end of the flange 23, and has an inner peripheral flange 26 on the other end. A cover plate 27 secured to the flange 26 is rotatably mounted by means of a ball bearing 28 on a reduced extension 29 of the shaft 17. It will be evident that the plates 18 and 27 constitute the end walls of the housing. To prevent the escape of lubricant from the housing along the shaft 17, suitable seal rings 30 and 31 are inserted respectively in the inner peripheral surfaces of the plates 18 and 27.

The main clutch 16 (see Fig. 1) may be provided in various forms, but is herein shown as of the twin disk type, comprising two intermediate disks 32 and 33 connected to the driving element 18, and alternately arranged between two end plates 34 and 35 and an intermediate disk 36 connected to the driven element 17. Annular friction rings 37 are secured respectively to opposite sides of the disks 32 and 33. To establish their connection with the driving element 18, the disks 32 and 33 are formed in their outer peripheries with a plurality of teeth 38 which slidably interfit with a plurality of uniformly peripherally spaced longitudinal spline keys 39 formed in the inner periphery of the flange 23.

The end plate 34 is formed on a parallel axially offset flange 40 which is integral with one end of an elongated sleeve 41 axially splined on the shaft 17 within the clutch housing, and which defines therewith an annular recess 42. A nut 43 threaded onto the reduced shaft extension 29 against the other end of the sleeve 41 serves to hold the flange 40 against a peripheral shoulder 44 on the shaft 17. Hence, the end plate 34 is axially stationary. The other end plate 35 is mounted for axial movement by means of internal teeth 45 slidably interfitting with a plurality of longitudinal spline keys 46 on the sleeve 41, and is formed on its inner side with an annular coaxial sleeve 47 extending through the intermediate disks 32, 33 and 36 and through the stationary end plate 34 into freely disposed relation in the recess 42. The intermediate disk 36 has internal teeth 48 slidably interfitting with longitudinal spline keys 49 on the sleeve 47.

A coiled compression spring 50 disposed within the sleeve 47 tends to separate the plates 34 and 35 and thereby to open the main clutch 16. One end of the spring 50 abuts against the inner side of the movable plate 35, and the other end bears against a ring 51 anchored relatively to the sleeve 41. The ring 51 seats against a series of lugs 52 struck outwardly respectively from the adjacent ends of a plurality of the tie bars 53. These bars are slidably mounted in longitudinal grooves 54 formed in the sleeve 41 between certain of the keys 46, and extend through a ring 55 opposed to the ring 51. A series of lugs 56 are struck outwardly respectively from the ends of the bars 53 to engage a ring 57a bearing frictionally against a nut 57 adjustably threaded on the outer end of the sleeve 41. Additional intermediate lugs 56a are struck outwardly from the bars 53 and engage in notches 55a in the ring 55. The ring 55 is splined for axial movement on the sleeve 41 by means of internal teeth 58 interfitting with the keys 46, and seats against the nut 57. The ball cam actuator 19, which includes the ring 55, is disposed about the sleeve 41 between the movable end plate 35 and the nut 57. Hence, by reason of the confining action of the lugs 52 and 56a and the pressure of the spring 50, the rings 51 and 55 are always located in a predetermined spaced relation.

The ball cam actuator 19 (see Figs. 6, 7, 12, and 13) is operable to exert an axial thrust on the movable plate 35 against the action of the spring 50 to close the main clutch 16. In its preferred form, the actuator 19 comprises a sleeve 59 of non-magnetic material rotatably encircling the sleeve 41, and formed on its inner periphery with a flange 60. The ring 55 and the flange 60 constitute opposed respectively fixed and movable end face ball races between which two balls 61 spaced 180° apart are inserted (see Figs. 6 and 7). Preferably, two hardened blocks or inserts 62 are mounted in recesses 63 in the inner end face of the ring 55, and two similar blocks 64 are mounted in recesses 65 in the opposed face of the flange 60. The blocks 62 and 64 are staggered endwise, and are formed respectively with opposed grooves or raceways 66 and 67 arcuate about the axis of the shaft 17 for rolling engagement by the balls 61. Oppositely facing stop shoulders 68 and 69 are provided respectively at the adjacent ends of the grooves 66 and 67 for engagement by the balls 61 when the actuator 19 is in idle position. The stop shoulders 68 and 69 may be provided in any suitable manner, and are herein shown as formed in the material of the ring 55 and the flange 60 and inclined to the path of the balls 61 in order to eliminate shock when the actuator 19 is returned into idle position. Thus, the flange 60 constitutes a thrust collar for the actuator 19 adapted to rock about a transverse axis passing through the balls 61.

A ring 70, mounted in the left end of the sleeve 59 in opposed relation to the flange 60, bears axially against an annular flange 71 on the end plate 35. The ring 70 has internal spline teeth 70a engaging the keys 46, and hence is rotatable with the sleeve 41. A cap nut 73 threaded onto the left end of the sleeve 59 substantially encloses the ring 70. The ring 70 and the flange 60 constitute respectively fixed and movable end face ball cam races between which two balls 74 are inserted. The balls 74 are spaced 180° apart, and are spaced 90° from the balls 61. Two hardened blocks or inserts 75 are mounted in recesses 76 in the left hand face of the flange 60, and two similar blocks 77 are mounted in recesses 78 in the opposed face of the ring 70. The blocks 75 and 77 are staggered endwise, and are formed respectively with opposed cam grooves or raceways 79 and 80 arcuate about and similarly inclined at a small peripheral angle for rolling engagement by the balls 74. Inclined stop shoulders 81 and 82 are formed in the flange 60 and the ring 70 at the deep ends of the cam grooves 79 and 80 to locate the balls 74 when the actuator is in idle position. It will be evident that the ring 70 and hence the movable clutch plate 35 are adapted to rock about a transverse axis passing through the balls 74 and extending perpendicularly to the axis through the balls 61.

When the clutch actuator 19 is in zero or idle position, i. e. when the main clutch 16 is open, the four balls 61 and 74 are respectively in engagement with the shoulders 68, 69, 81, and 82. Upon rotation of the sleeve 59 out of the idle position, shown in Fig. 6, the balls 74 will roll along the cam grooves 79 and 80 to close the main clutch 16 against the action of the spring 50. Since the sleeve 59 and the ring 70 are adapted to rock respectively about two mutually perpendicular axes, the pressure is distributed equally between the balls regardless of slight inaccuracies that may be present in the coacting parts, and the pressure of the end plates 34 and 35 on the friction rings 31 is balanced. A slight clearance is provided between the sleeve 47 and the end plate 34, the teeth 45 and the spline keys 46, and the sleeve 59 and other relatively movable parts to permit such self-compensating movement.

When the sleeve 59 is released, the spring 50 acting through the cam grooves 79 and 80 serves to return the parts to initial position. The shoulders 68, 69, 81, and 82 act as bumpers for the balls 61 and 74 to prevent injury thereto upon impact at the end of the clutch opening movement. The impact is minimized by reason of the inclination of the shoulders which imparts cam characteristics thereto permitting the actuator slightly to overrun its idle position in the opening movement. If the balls 61 and 74 should slip slightly relative to the coacting grooves 66, 67, 79, and 80, they will be reestablished in correct position through coaction with the inclined shoulders at the end of the opening movement. Hence, the angular spacing of the balls 61 and 74 is substantially maintained.

The shape of the cam grooves 79 and 80 may be varied to impart different characteristics to the ball cam actuator 19. Thus, in the development shown in Fig. 15, the grooves 79 and 80 are formed, i. e. have a variable angle, and hence a variable force multiplying factor. In the present instance, the initial portion a of each of the cam grooves 79 and 80 has a steep angle, and the final portion b has a slight angle.

The formed cam grooves 79 and 80 are advantageous where the actuator 19 is intended only to close and open the clutch. Thus, during the initial closing movement when the required closing pressure is relatively low, the steep portions a afford adequate power. These portions are formed to overcome the pressure of the spring 50. During the final closing movement when the power requirements are substantially increased, the low-angle portions b are operative. Thus, the graduated slope of the cam grooves 79 and 80 increases the available power as the spring pressure and the clutch pressure is increased, and decreases the required extent of rotation of the actuator 19. Because of the reduced force and extent of movement initially imparted thereto, the actuator 19 is operable at a decreased velocity, and hence will not overrun. The substantial angle of the initial cam portions a also causes the spring 50 to hold the actuator 19 firmly in idle position.

In the modified development illustrated in Fig. 14, the cam grooves 79 and 80 are straight, and have a constant force multiplying factor. This shape is advantageous where it is desired to obtain a graduated control of the clutch pressure, as for example by varying the excitation of an electromagnetic clutch by adjustment of a rheostat (not shown) to operate the actuator 19. If the cam grooves were to be substantially graduated or formed, the minimum rheostat adjustment for the initial steep portions would be too high for the final low-angle portions.

Wear on the friction rings 37 of the main clutch 16 is automatically compensated. The means for this purpose in its preferred form (see Figs. 1, 2, 9 and 10) comprises the nut 57 which is formed in its outer periphery with an annular groove 83 defining two parallel circumferential ridges 84 and 85 formed with ratchet teeth 86. A split band spring 87 is inserted in the groove 83, and is bent outwardly and enlarged at one end to provide a spring pawl 88 adapted for engagement with both series of teeth 86. An arm 89 projects laterally from one side of the pawl 88, and is formed on its free end with oppositely extending curved fingers 90 and 91. Secured to the inner periphery of the right end of the sleeve 59 is a circular split spring 92 held in position by dowels 93. The ends of the spring 92 are formed respectively with two spaced inwardly projecting lugs 94 and 95 located at opposite sides of the arm 89 and adapted for engagement respectively with the fingers 90 and 91. The stops 94 and 95 are V-shaped to engage the fingers 90 and 91 at an angle, and thereby to avoid shock. A flange nut 96 threaded onto the right end of the sleeve 59 serves to enclose the pawl and ratchet mechanism.

Figure 2:
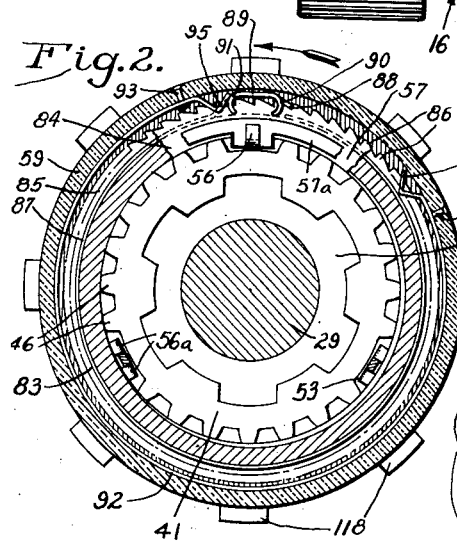
Fig. 2 is a transverse sectional view taken substantially along line 2—2 of Fig. 1, and illustrating a self-adjusting mechanism for compensating for wear on the friction surfaces of the main clutch.

The parts are shown in Fig. 2 in their idle position normally occupied when the main clutch 16 is open. In closing the clutch 16, the sleeve 59 is rotated in a counterclockwise direction as indicated by the arrow. If the clutch 16 is properly adjusted, the sleeve 59 will be rotated until the lug 94 engages the finger 90, but not enough to move the latter or the pawl 88 through the distance of one ratchet tooth 86. In the opening movement, the lug 95 will engage the finger 91 to return the pawl 88 into initial position in engagement with the same tooth without effecting any adjustment of the nut 57. The amplitude of movement of the pawl 88 increases as the wear on the friction rings 37 is progressively increased in successive operations of the clutch 16. When the wear, measured in degrees of rotation of the sleeve 59, exceeds the distance of one tooth 86, the pawl 88 will engage a new tooth. In the succeeding opening movement of the clutch 16, the lug 95 will cause the pawl 88 to rotate the nut 57 through the distance of one tooth, thereby reducing the spacing between the ring 55 and the fixed end plate 34. By reason of the foregoing construction, the spring 50 is required only to work through the clutch opening and closing range and not through the aggregate range of wear, and therefore is maintained at a constant operating pressure regardless of wear on the friction rings 37. When the clutch 16 is used with a ball cam actuator 19, as herein shown, the cam grooves 79 and 80 can have an angle more gradual than would otherwise be feasible, and can be graduated or shaped to greater advantage.

The flange 60 and the end caps 73 and 96 define two oil pockets for the two sets of balls 61 and 74. These pockets are filled with a suitable lubricant. When the clutch 16 is running, the lubricant is distributed by centrifugal force in a thin layer on the inner peripheral surface of the sleeve 59. The balls 61 and 74 dip into this film, thereby assuring lubrication of the balls and their races.

Within certain aspects of the invention, the pilot clutch 20 may be provided in any desired form. However, the pilot clutch 20 preferably is of the electromagnetic type with a stationary exciting coil 97 which is especially suitable in the compound clutch mechanism herein disclosed. The pilot clutch 20 of the foregoing type is operable with a relatively low current consumption and under all load conditions of the main clutch 16 to satisfy the relatively low force requirements of the force multiplying actuator 19, and at the same time is inexpensive in construction, not subject to operating troubles commonly encountered, and long lived in operation. Thus, the coil 97 requires no contact slip rings or brush mountings, and hence avoids the necessity for maintaining these parts and correcting contact difficulties. The coil 97 need not be protected against the clutch pressure, and is located out of thermal contact with the high temperature parts. No voltage drop, with attendant loss of power, such as occurs at the brush contacts in other types of electromagnetic clutches, is possible.

The coil 97 consists of two annular sections rigidly mounted in axially spaced relation concentrically about the cage 24 within a supporting ring 98, and defining an intermediate air space 99 for ventilation. A plurality of peripherally spaced apertures 100 in the ring 98 open to the space 99. Secured to the opposite ends of the ring 98 are two angle-shaped rings 101 and 102 of magnetic material, the rings 101 and 102 having spaced oppositely extending legs 103 and 104 projecting axially into the coil sections, and constituting flux transfer poles.

Figure 3:
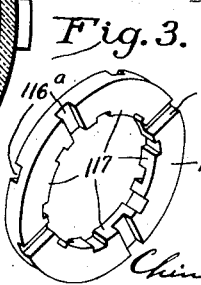
Fig. 3 is a perspective view of a disk forming part of the pilot clutch.

The cage 24 (see Fig. 8) comprises a plurality of uniformly peripherally spaced longitudinal bars 105 of non-magnetic material connecting the flanges 25 and 26. Mounted within the cage 24 and the coil 97 about the sleeve 59 for relative axial movement are two ring-shaped end plates 106 and 107 formed with transverse notches 108 slidably receiving the bars 105, and hence constrained to rotate with the driving member 18. The plate 106 is movable axially, and the plate 107 is positioned against the cage flange 26. Positioned in direct contact against the adjacent side faces of the end plates 106 and 107 are two annular armature disks 109 and 110. Each of these disks is connected for rotation with the driving member 18 by means of radially projecting lugs 111 engaging opposite sides of the cage bars 105. Two annular rings 112 and 113 defining working pole faces 114 and 115 on their adjacent ends snugly encircle the disks 109 and 110, and are connected for rotation therewith through interfitting engagement with the lugs 111. An intermediate disk 116 is positioned between the rings 112 and 113 in direct bearing engagement adjacent its outer periphery with the pole faces 114 and 115, and is formed in its inner periphery with a series of notches 117 slidably engaging a plurality of longitudinal spline keys 118 on the exterior of the sleeve 59. Radial ventilating grooves 116ª (see Fig. 3) are formed in opposite sides of the disk 116, the grooves on one side being staggered with respect to those on the other side. Secured to the adjacent sides of the disks 109 and 110 and spaced inwardly from the pole rings 112 and 113 are two friction rings 119 and 120 in bearing engagement with opposite sides of the disk 116. Two annular grooves 121 and 122 are formed in opposite sides of the disk 116 in registration with the spaces between the rings 112 and 113, and 119 and 120 to provide air gaps.

It will be evident that all of the members positioned within and splined for axial movement to the cage 24, such as the end plates 106 and 107, the disks 109 and 110 with the friction rings 119 and 120, and the rings 112 and 113, may be disassembled from the cage by relative axial movement in a direction away from the flange 26 through the flange 25, the inward peripheral edge of the flange 25 being spaced radially outwardly of the spline bars 105.

The path of flux is indicated by the arrows in Fig. 11, and comprises a circuit through the transfer pole 103, the end plate 106, the pole ring 112, the disk 116, the pole ring 113, the end plate 107, the transfer pole 104, and the rings 102, 98 and 101. Since the working pole faces 114 and 115 are in direct contact with the disk 116, the metallic flux circuit is interrupted only by two relatively small air gaps 123 and 124 between the transfer poles 103 and 104 and the end plates 106 and 107. The transfer poles 103 and 104 and the opposed surfaces of the end plates 106 and 107 provide a transfer area which is very large in relation to that of the working pole faces 114 and 115. Since the flux density varies inversely as the square of the area, lateral pull on the end plates 106 and 107 is materially reduced, and hence any tendency of the plates to depart from true concentricity with the transfer poles 103 and 104 is substantially avoided. The air gaps 123 and 124 are necessary to provide a mechanical separation between the fixed and movable parts of the clutch 20, but are utilized to serve two purposes. Thus, the gaps 123 and 124 serve as transfer gaps and also as interruptions to eliminate residual magnetism. They are of sufficient radial width to provide adequate clearance between the transfer poles 103 and 104 and the end plates 106 and 107, regardless of any slight eccentricity that may develop or any slight manufacturing inaccuracies that may exist, and still have but a relatively small magnetic reluctance.

The pole faces 114 and 115 are adapted for direct rubbing contact with the disk 116. When the coil 97 is energized the end plate 106 is attracted through a small range to increase the bearing pressure to close the clutch 20. No substantial air gap and no spring pressure need be overcome, and hence the force requirements for closing the clutch 20 are relatively low and practically constant. As a result, the clutch has a high rating for a given size and current input, and is subject to a finely graduated control.

Wear on the disk 116, the pole faces 114 and 115 and the friction rings 119 and 120 will not vary the force requirements. The friction rings 119 and 120 will wear in use, but will cause little wear on the contacting areas of the disk 116. The pole faces 114 and 115 and the areas of the disk 116 contacting therewith will wear substantially equally, and hence these areas of the disk will recede inwardly. However, by reason of the air gaps 121 and 122, peripheral contact between the rings 112 and 113 and the disk 116 will not be established, and hence the contacting pole areas will remain constant in size, and no loss of flux will be suffered.

Figure 4:
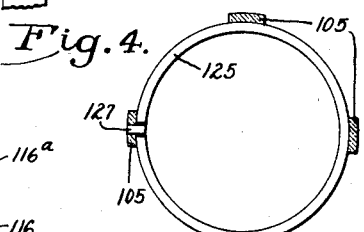
Fig. 4 is a fragmentary transverse sectional view on a reduced scale taken along line 4—4 of Fig. 1, and illustrating a friction ring forming part of a self-adjusting mechanism for compensating for wear on the friction surfaces of the pilot clutch.

Means is provided to limit the extent to which the end plates 106 and 107 can separate when the closing pressure of the pilot clutch 20 is released, and to maintain the distance constant regardless of wear on the friction rings 119 and 120. This means (see Figs. 1 and 4) comprises a circular split spring 125 which is seated in an annular groove 126 in the periphery of the end plate 106, and which acts resiliently against the inner surfaces of the cage bars 105 to provide a frictional drag. A pin 127 projects inwardly from one of the bars 105 between the ends of the spring 125 to retain the ends in position beneath this bar. The groove 126 is slightly greater in width than the spring 125. The frictional drag of the spring 125 on the cage bars 105 is sufficient to prevent displacement of the spring when the clutch 20 is opened, and hence limits the movement of the end plate 106 to the small play permitted by the groove 126. As wear occurs on the clutch friction surfaces, the closing movement of the end plate 106 acts to adjust the spring 125 against the frictional drag a corresponding extent. The motion of the end plate 106 does not include the wear range so that the clutch can be worn down completely while maintaining its low force requirements.

When the electromagnet is deenergized to remove the closing force on the pilot clutch, the clutch elements are self-acting by reason of the rubbing action therebetween to effect a minute separation sufficient for release, but this separation is not necessarily as great as, and in any event is limited to, the maximum range determined by the clearance between the sides of the ring 125 and the groove 126. Since no means is provided for urging the clutch elements apart, they tend to remain substantially in contact but without a gripping pressure when released since a slight resistance to movement is set up by the inertia of the parts and the spline connections with the bars 105.

Lubricant is prevented from reaching the friction surfaces of the clutches 16 and 20. Any lubricant passing along the sleeve 41 into the main clutch 16 is prevented from reaching the friction surfaces by the sleeve 47, and is directed into the recess 42 from where it is discharged by centrifugal force through suitable openings 128 in the flange 40. On leaving the openings 128, the lubricant is directed by a conical baffle 129 to suitable openings 130 in the plate 18. Lubricant finding its way into the space between the clutches 16 and 20 is directed by the action of centrifugal force across conical overlapping baffle flanges 131 and 132 on the end plates 35 and 106 through openings 133 discharging to the spaces between the cage bars 105. Openings 134 are provided in the flange 26 to discharge any lubricant that may enter the space to the right of the clutch 20.

The operation of the clutch mechanism will be evident from the foregoing description, and briefly summarized is as follows: Normally the actuator 19 occupies its idle or rest position illustrated in Fig. 6 in which it is held by the pressure of the spring 50. When the coil 97 is energized, the pressure in the pilot clutch 20 is increased sufficiently to rotate the actuator 19 in a counterclockwise direction as viewed in Fig. 2. Thereupon, the balls 74 coacting with the cam grooves 79 and 80 will actuate the end plate 35 to close the main clutch 16. If the cam grooves 79 and 80 are graduated or formed as illustrated in Fig. 15, the initial force will be comparatively low, and the final force will be comparatively heavy. Upon deenergizing the coil 97, the axial thrust of the spring 50 will reverse the operation of the actuator 19, thereby returning the parts to their initial positions. Wear in the main clutch 16 is compensated through automatic adjustment of the nut 57 which serves to advance the actuator 19 and plate 35 toward the plate 34. Wear in the pilot clutch 20 is also automatically compensated to maintain a constant range of opening and closing movement.

I claim as my invention:

1. A clutch mechanism comprising, in combination, a main clutch having a relatively large capacity and having a plurality of relatively axially movable clutch elements, a force-multiplying rotary cam actuator for closing said clutch by forcing said elements axially into engagement, and an electromagnetic clutch having a stationary exciting coil enclosing driving and driven friction elements for operating said actuator to close said main clutch.

2. A clutch mechanism comprising, in combination, a shaft member, a coaxial member, an elongated sleeve fixed on said shaft member, coacting relatively axially adjustable friction clutch elements secured for rotation respectively with said members and including two end elements, one of said end elements being fixed on said sleeve and defining an annular recess, the other of said end elements being movable along said sleeve and having a coaxial sleeve extending through the remaining elements into said recess, a stop fixed on said sleeve outside of the movable end element, a stop between said end elements in fixed relation to said first mentioned stop, a coil compression spring between said sleeves and abutting at opposite ends against said movable element and said last mentioned stop, axially extensible means disposed in end abutment with said first mentioned stop and said movable element, and means for operating said extensible means to move said elements into frictional engagement.

3. A clutch mechanism comprising, in combination, a clutch having a plurality of elements movable axially into and out of engagement, an end face ball cam actuator for said clutch and having only two balls spaced 180 degrees apart, an end thrust ball bearing reacting against the pressure of said actuator on said clutch, and having only two balls spaced 180 degrees apart and 90 degrees from said first mentioned balls, and means for operating said actuator.

4. A clutch mechanism comprising, in combination, a clutch having a plurality of elements including an end actuating element movable axially into and out of engagement, a stop spaced axially from said clutch, an end thrust ball bearing positioned against said stop and having only two balls spaced 180 degrees apart, and an end face ball cam clutch actuator operatively disposed coaxially between said actuating element and said bearing and having only two balls spaced 180 degrees apart and 90 degrees from said first mentioned balls, and means for operating said actuator.

5. A clutch mechanism comprising, in combination, a shaft member, a plate member rotatable on said shaft member and having an annular sleeve, a sleeve keyed to said shaft member, a plurality of coaxial friction clutch elements alternately secured for rotation respectively with said members, one end element being fixed on said last mentioned sleeve, the other of said elements being free for axial movement, the other end element having a coaxial sleeve extending through the intermediate elements, a coiled compression spring interposed between said last two mentioned sleeves and tending to separate said end elements, and means for moving said elements into engagement.

6. A clutch mechanism comprising, in combination, a shaft member, a plate member rotatable on said shaft member and having an annular sleeve, oil passages opening through said plate member, baffle means for directing oil under centrifugal force to said passages, a sleeve keyed to said shaft, a plurality of coaxial friction clutch elements alternately secured for rotation respectively with said members, one end element being fixed on said last mentioned sleeve and defining an annular recess therewith, oil passages opening through said end element for directing oil from said recess to said baffle means, the other of said elements being free for axial movement, the other end element having a coaxial sleeve extending through the intermediate elements into said recess, a coiled compression spring interposed between said last two mentioned sleeves and tending to separate said end elements, and means for moving said elements into engagement.

7. A clutch mechanism comprising, in combination, a shaft member, a plate member rotatable on said shaft member and having an annular sleeve, a sleeve keyed to said shaft member, a plurality of coaxial friction clutch elements alternately secured for rotation respectively with said members, one end element being fixed on said last mentioned sleeve and defining an annular coaxial recess, the other of said elements being free for axial movement, the other end element having a coaxial sleeve extending loosely into said recess and being free for a limited universal rocking movement, a coiled compression spring interposed between said last two mentioned sleeves and tending to separate said elements, and means for exerting an axial thrust on said other element to move said elements into engagement, said means being freely universally adjustable for self adaptation to the position of said other element.

8. A clutch mechanism comprising, in combination, a shaft member, a second member rotatable about said shaft member, a plurality of driving and driven friction clutch elements secured respectively for rotation with said members and movable axially into and out of engagement, a sleeve fixed on said shaft member and rigid with one end element, a nut adjustably threaded on said sleeve, a stop encircling said sleeve between the end elements, a plurality of tie bars longitudinally slidable along said sleeve and limiting the spacing of said nut and stop, a coiled compression spring encircling said sleeve and interposed between the other end element and said stop, an axially extensible cam actuator seating against said nut and acting against said other element, and means for automatically adjusting said nut to compensate for wear on said elements.

9. An electromagnetic clutch comprising, in combination, coaxial driving and driven members, two coaxial end face clutch elements mounted for relative axial movement into and out of coacting engagement and for rotation respectively with said members, an annular friction facing secured on one of said elements for engagement with the other of said elements, an annular pole projection on said one element in concentrically spaced relation about said facing and having a pole face for direct engagement with said other element, and a stationary electromagnet for effecting engagement of said elements.

10. An electromagnetic clutch comprising, in combination, coaxial driving and driven members, two coaxial end face clutch elements mounted for relative axial movement into and out of coacting engagement and for rotation respectively with said members, an annular friction facing secured on one of said elements for engagement with the other of said elements, an annular pole projection on said one element in concentrically spaced relation about said facing and having a pole face initially flush with the friction surface of said facing for direct rubbing engagement with said other element, an annular groove in said other element opposite the space between said facing and said pole projection, and an electromagnet for effecting engagement between said elements.

11. An electromagnetic clutch comprising, in combination, coaxial driving and driven members, two coaxial end face friction clutch elements mounted for relative axial floating movement into and out of engagement and for rotation respectively with said members, and having pole faces adapted for direct rubbing engagement, and an electromagnet encircling said elements and for effecting engagement of said elements, whereby said elements are separable upon deenergization of said electromagnet solely in response to release of the pressure of clutch engagement.

12. An electromagnetic clutch comprising, in combination, coaxial driving and driven members, two coaxial clutch elements mounted for rotation respectively with said members and for relative axial movement, an annular pole ring mounted on one of said elements for movement therewith and adapted for direct bearing engagement with the other of said elements, friction facing means between said elements, and an electromagnet for effecting relative axial engagement between said elements.

13. An electromagnetic clutch comprising, in combination, coaxial driving and driven members, two coaxial friction disk clutch elements connected for rotation respectively with said members and having magnetic pole faces adapted for direct bearing engagement, one of said elements being axially stationary and the other of said elements being adapted for free axial floating movement, a stationary electromagnet for attracting said pole faces into engagement, and a detent having a limited axial lost motion connection with said last mentioned element and being in frictional engagement with one of said members.

14. An electromagnetic clutch comprising, in combination, coaxial driving and driven elements, two coaxial friction disk clutch elements connected for rotation respectively to said elements and having opposed magnetic pole faces, an electromagnet for attracting said pole faces, one of said elements being axially stationary and the other of said elements being axially movable and having a peripheral groove, and a split circular spring fitting freely in said groove and resiliently engaging one of said members to provide a frictional drag, said spring being less in width than said groove.

15. An electromagnetic clutch comprising, in combination, coaxial rotary inner and outer members, a cylindrical housing secured coaxially to said outer member, two friction disk clutch elements mounted within said housing and connected for rotation respectively with said members, and having opposed magnetic pole faces, one of said elements being axially stationary and the other of said elements being axially movable and formed with an outer peripheral groove, a split circular spring positioned in said groove and bearing frictionally against the interior of said housing, said groove being greater in width than said ring to permit a limited degree of lost motion, and means for securing said spring against rotation in said groove.

16. An electromagnetic clutch comprising, in combination, a stationary annular electromagnet having annular transfer poles in opposite ends, coaxial driving and driven members, a cage of non-magnetic material fixed on one of said members and extending through said electromagnet, said cage having longitudinal spline bars connected at one end by an annular internal flange and at the other end by an annular external flange, two rings mounted within and concentrically of said electromagnet and said cage, and defining peripheral transfer pole faces respectively in opposed closely spaced relation to said first mentioned faces, one of said rings being positioned against said internal flange for rotation with said cage, the other of said rings being splined to said bars for axial movement, two clutch disks axially splined to said bars and positioned respectively against the adjacent faces of said rings, an intermediate clutch disk positioned between said two disks and axially splined to the other of said members, friction facings between said disks, and two working pole rings keyed for rotation with and separably positioned against the adjacent faces of said two disks for direct bearing engagement with opposite sides of said intermediate disk, said rings and disks being axially removable from said cage through said external flange.

17. An electromagnetic clutch comprising, in combination, a stationary annular electromagnet having annular transfer poles in opposite ends, coaxial driving and driven members, a cage of non-magnetic material fixed on one of said members and extending through said electromagnet, said cage having longitudinal spline bars, two rings mounted within and concentrically of said electromagnet and said cage, and defining peripheral transfer pole faces respectively in opposed closely spaced relation to said first mentioned faces, stop means for one of said rings, the other of said rings being splined to said bars for axial movement, two clutch disks axially splined to said bars and positioned respectively against the adjacent faces of said rings, an intermediate clutch disk positioned between said two disks and axially splined to the other of said members, friction facings between said disks, and two working pole rings keyed for rotation with and positioned against the adjacent faces of said two disks for direct bearing engagement with opposite sides of said intermediate disk.

18. An electromagnetic clutch comprising, in combination, coaxial driving and driven members, an axially fixed clutch element, an axially movable clutch element secured for rotation with one of said members, a clutch element intermediate said first mentioned clutch elements and secured for rotation with and axial movement along the other of said members, and a stationary annular electromagnet encircling said elements, said elements having pole faces in direct rubbing engagement and located in the path of flux of said electromagnet.

19. An electromagnetic clutch comprising, in combination, coaxial driving and driven members, an axially fixed friction clutch element, an axially movable friction clutch element secured for rotation with one of said members, a clutch element intermediate said first mentioned clutch elements and secured for rotation with and axial movement along the other of said members, a stationary annular electromagnet encircling said elements, said elements having pole faces adapted to be in direct rubbing engagement and located in the path of flux of said electromagnet, and means for automatically limiting the range of movement of said movable element to a predetermined distance regardless of wear.

20. A clutch mechanism comprising, in combination, a friction disk clutch having a plurality of clutch elements movable axially into and out of engagement and including one axially fixed end element, a stop nut adjustably fixed in relation to said end element, an actuator for said clutch seated against said nut and having a rotary operating member, a ratchet wheel rigid with said nut, an oscillatory pawl in engagement with said wheel, and spaced stops on said operating member at opposite sides of said pawl for oscillating the latter, whereby said nut will be automatically adjusted relative to said end element to compensate for wear on said elements.

21. A clutch mechanism comprising, in combination, a friction disk clutch having a plurality of clutch elements movable axially into and out of engagement and including one axially fixed end element, a stop nut adjustably fixed in relation to said end element, an actuator for said clutch seated against said nut and having a rotary operating member, a ratchet wheel rigid with said nut and formed with a peripheral groove, a split circular spring positioned in said groove and formed with a pawl in engagement with said wheel, a lateral arm on said pawl and formed with oppositely facing spring abutments, and two spaced stops on said operating member at opposite sides of said arm for engagement respectively with said abutments to oscillate said pawl.

22. A clutch mechanism comprising, in combination, a friction disk clutch having a plurality of clutch elements movable axially into and out of engagement and including one axially fixed end element, a sleeve rigid with said end element, a stop nut threaded on said sleeve, an actuator for said clutch seated against said nut and having a rotary operating sleeve, a ratchet wheel rigid with said nut, a freely oscillatory pawl in engagement with said wheel and having a lateral projection, and two spaced stops on said operating sleeve for respectively engaging opposite sides of said projection to oscillate said pawl.

23. An end face ball cam actuator comprising, in combination, two coaxial elements having opposed end faces, means for limiting axial movement of one of said elements in one direction, two cam grooves spaced 180 degrees apart in one of said faces and being arcuate about the axis of said elements and formed with an axial lead in one direction, two grooves spaced 180 degrees apart in the other of said faces and located in opposed cooperative relation to said cam grooves, two balls disposed in rolling engagement with said sets of grooves and being spaced 180 degrees apart to permit relative rocking movement between said elements about a transverse axis, and means for rotating said elements relatively to each other.

24. In a clutch mechanism, in combination, two coaxial elements having opposed end faces, means for limiting axial movement of one of said elements in one direction, two cam grooves spaced 180 degrees apart in each of said faces and being arcuate about the axis of said elements, the sets of grooves being located in opposed cooperative relation and having axial leads in the same direction, two balls disposed in rolling engagement with said sets of grooves and being spaced 180 degrees apart to permit relative rocking movement between said elements about a transverse axis, and means for rotating said elements relatively to each other.

25. In a clutch mechanism, in combination, two coaxial elements having opposed end faces, means for limiting axial movement of one of said elements in one direction, two hardened blocks spaced 180 degrees apart and inserted in each of said faces, each block being formed with a cam groove arcuate about the axis of said elements and having a stop at its leading end, the sets of grooves in said end faces being located in opposed cooperative relation and being inclined in the same direction relatively to said axis, two balls disposed in rolling engagement with said sets of grooves and being spaced 180 degrees apart when in engagement with said stops to permit relative rocking movement between said elements about a transverse axis, and means for rotating said elements relatively to each other.

26. In a clutch mechanism, in combination, two coaxial elements having opposed end faces, means for limiting axial movement of one of said elements in one direction, two cam grooves spaced 180 degrees apart in each of said faces, each cam groove being arcuate about the axis of rotation of said elements and being formed with a leading face portion having a relatively steep slope, with a stop at the leading end of said portion and with a trailing face portion having a relatively gradual slope, the sets of grooves in said end faces being located in opposed cooperative relation and having axial leads in the same direction, two balls disposed in rolling engagement with said sets of grooves and being spaced 180 degrees apart to permit relative rocking movement between said elements about a transverse axis, and means for rotating said elements relatively to each other.

27. An end face ball cam actuator comprising, in combination, three coaxial elements having two sets of opposed end faces, two grooves spaced 180 degrees apart in each of one set of end faces, the sets of grooves being uniformly arcuate about the axis of said elements and being located in opposed cooperative relation, two balls disposed in bearing engagement with said sets of grooves and spaced 180 degrees apart to permit relative rocking movement of the associated elements about a transverse axis, two cam grooves spaced 180 degrees apart in each of the other set of end faces and spaced 90 degrees from said first mentioned grooves, the sets of cam grooves being uniformly arcuate about said axis and being located in opposed cooperative relation, two balls disposed in bearing engagement with said sets of cam grooves and being spaced 180 degrees apart to permit relative rocking movement between the associated elements about a transverse axis perpendicular to said first mentioned transverse axis, and means for rotating the intermediate element relative to the end elements.

28. In a clutch mechanism, in combination, three coaxial elements having two sets of opposed end faces, two grooves spaced 180 degrees apart in each of one set of end faces, the sets of grooves being uniformly arcuate about the axis of said elements and being located in opposed cooperative relation, two balls disposed in bearing engagement with said sets of grooves and spaced 180 degrees apart to permit relative rocking movement of the associated elements about a transverse axis, two graduated cam grooves spaced 180 degrees apart in each of the other set of end faces and spaced 90 degrees from said first mentioned grooves, said cam grooves being uniformly arcuate about said axis and each being formed with a leading face portion having a relatively steep slope, with a stop shoulder at the leading end of said portion, and with a trailing face portion having a relatively gradual slope, the sets of cam grooves being located in opposed cooperative relation and having axial leads in the same direction, two balls disposed in bearing engagement with said sets of cam grooves and being spaced 180 degrees apart to permit relative rocking movement between the associated elements about a transverse axis perpendicular to said first mentioned transverse axis, and means for rotating the intermediate element relative to the end elements.

29. In a clutch mechanism, in combination, a sleeve, a nut threaded on said sleeve, an outer concentric sleeve having an internal peripheral flange with opposite end faces, a ring interposed between said nut and said flange and bearing against said nut and having an end face opposed to said flange, means for preventing rotation of said ring relative to said nut, two grooves spaced 180 degrees apart in each of the adjacent end faces of said flange and said ring, each groove being arcuate about the axis of said flange, two balls disposed in bearing engagement with said sets of grooves and being spaced 180 degrees apart, a ring having an end face in opposed relation to the other end face of said flange and normally being secured against rotation, two cam grooves spaced 180 degrees apart in each of said last mentioned end faces, said cam grooves being arcuate about the axis of said flange and being located in opposed cooperative relation, two balls disposed in bearing engagement with said sets of cam grooves and being spaced 180 degrees apart and 90 degrees from said first mentioned balls, and means for rotating said flange.

HOWARD D. COLMAN.